United States Patent [19]
Lin et al.

[11] Patent Number: 5,506,737
[45] Date of Patent: Apr. 9, 1996

[54] HIGH-DENSITY ELECTRONIC HEAD

[75] Inventors: Hsiao-Yi Lin, Hualien Hsien; Tan F. Lei; Tsung-Shin Chen, both of Hsinchu, all of Taiwan

[73] Assignee: Industrial Technology Research Institute, Hsinchu, Taiwan

[21] Appl. No.: 270,300

[22] Filed: Jul. 5, 1994

[51] Int. Cl.$^6$ .................................. G11B 5/147
[52] U.S. Cl. ........................... 360/121; 360/126
[58] Field of Search ............................ 360/121, 125–127

[56] References Cited

U.S. PATENT DOCUMENTS

| | | | |
|---|---|---|---|
| 4,373,173 | 2/1983 | Robinson et al. | 360/121 |
| 4,418,472 | 12/1983 | Lorenze, Jr. | 360/121 X |
| 4,625,250 | 11/1986 | Shibata | 360/121 |
| 5,224,002 | 6/1993 | Nakashima | 360/126 |
| 5,237,476 | 8/1993 | Bischoff et al. | 360/121 X |
| 5,251,088 | 10/1993 | Coutellier et al. | 360/113 |

*Primary Examiner*—John H. Wolff
*Attorney, Agent, or Firm*—W. Wayne Liauh

[57] ABSTRACT

A VLSI-compatible process for the manufacturing of a monolithic high-density electronic head in the form of a single composite IC chip for reading and/or writing multiple tracks of magnetically recordable information. The VLSI-compatible process comprises the steps of fabricating a digital signal process circuit as well as other desired circuit components on a substrate, then fabricating a plurality of read and/or write elements on the same substrate using a thin film technique. Because the silicon-based materials, which are used to replace the conventional magneto-resistant elements, show very little magneto-resistance effect at room temperature, a magnetically sensitive layer is provided which comprises a double-drain polycrystalline thin-films transistor (DTFT) to provide the required sensitivity. Furthermore, because no wire-bonding is required between the write or read head and the necessary circuitry components, IC chips providing very high density monolithic electronic heads can be manufactured using the VLSI-compatible process, and each of the chips contains a very large number, in the order of several hundred, of read and/or write elements, as well as the necessary and/or desired electronic circuits. A plurality of read/write elements can be assigned to a common track of data to improve the accuracy and sensitivity of data transmission, or each element can be assigned to a respective track of data.

19 Claims, 5 Drawing Sheets

HIGH-DENSITY ELECTRONIC HEAD

FIELD OF THE INVENTION

The present invention relates to a composite integrated circuit (IC) chip that contains a plurality of read and/or write elements and a digital signal processing (DSP) circuit on the same chip. More specifically, the present invention relates to a high-density electronic head in the form of a single composite IC chip for reading and/or writing multiple tracks of magnetically recordable data. The composite IC chip contains a plurality of read and/or write elements fabricated by a thin film process; the same chip also contains a digital signal processing circuit as well as other necessary circuit components that are fabricated prior to the deposition of the multiple read and/or write elements. Alternatively, the present invention relates to a VLSI-compatible process for the manufacturing of a monolithic high-density electronic head in the form of a single composite IC chip for reading and/or writing multiple tracks of magnetically recordable information. The VLSI-compatible process disclosed in the present invention involves the steps of fabricating a digital signal process circuit as well as other desired circuit components on a substrate, then fabricating a plurality of read and/or write elements on the same substrate using a thin film technique.

BACKGROUND OF THE INVENTION

Because of their relatively low recording (reading and writing) density, conventional magnetic heads are very limited in their applications for recording (writing) and retrieving (reading) mega- or giga-scale massive amounts of data that have become a trend in the informations industry. Furthermore, conventional magnetic heads also suffer from the weakness of requiting a laborious manufacturing procedure for making the same.

In order to record mass information, multiple-track read and write magnetic heads have been proposed in the art. For example, U.S. Pat. Nos. 5,224,002 and 5,251,088, the contents of which are explicitly incorporated herein by reference, disclose magnetic write and read heads prepared using a thin-film technology. Magnetic thin-film materials (such as Fe, Co, Ni, or their alloys) are used as a core material and a conducting material, such as Cu, is used as a thin-film coil to fabricate write heads. The read head comprises a plurality of solid-state elements, such as magneto-resistance elements, which are formed into a plurality of magnetically sensitive layers in plans parallel to the plan of a substrate and the passage of the track to read a large number of tracks. The magnetically sensitive thin-flints are inserted into a magnetic circuit, which has the shape of a ring with an open gap. These multiple-track heads have been applied by Phillips Electronics Corp. in the production of digital compact: cassette (DCC) devices, and the resultant product can simultaneously read or write up to 18 tracks of data. Although this is a substantial improvement over the conventional magnetic heads, the recording density is still less than what would be desired, especially in light of the rapid advancement of the laser based optical recording devices.

SUMMARY OF THE INVENTION

The primary object of the present invention is to provide a monolithic high-density electronic head that can concurrently record (i.e., read and/or write) a vast number of tracks (in the order of several hundred) of data. The high-density electronic head disclosed in the present invention is provided in the form of a single IC chip, which contains a plurality of read and/or write elements fabricated by a thin film process, the stone drip also contains a digital signal processing (DSP) circuit as well as other necessary circuit components that were fabricated prior to the fabrication of the multiple read and/or write elements.

Another object of the present invention is to provide a VLSI-compatible process for the manufacturing of monolithic high-density electronic heads in the form of single composite IC chips that can read and/or write multiple tracks of magnetically recordable information. The process disclosed in the present invention comprises the steps of first fabricating a DSP circuit as well as other desired circuit components, including an amplification circuit, on a substrate, then fabricating a plurality of read and/or write elements on the same substrate using a thin film technique. In the preferred embodiments of the present invention, the write and read heads are fabricated in separate chips, each chip containing a separate DSP circuit and other necessary accessory circuits of its own. The write head can be fabricated using a conventional thin-film technology similar to that disclosed in the '002 patent. However, the magneto-resistance elements in the sensitive magnetic layers are replaced in the present invention by silicon-based thin films. The various thin films are formed on a substrate that already contains the accessory circuits fabricated thereon, but with a space reserved for depositing the thin film write elements. In a preferred embodiment, a write head of the present invention is fabricated in accordance with the following procedure:

(A-1) fabricating a DSP circuit and other necessary and/or desired circuits on a substrate while reserving a space near the edge of the designed chip area for the write head, which contains a plurality of write elements, to be subsequently fabricated;

(A-2) sputtering a first thin film of a magnetic layer, such as an amorphous or Ni—Fe alloy, etc., on the reserved area of the substrate, then using a first lithography and a reactive ion etching technique to form a bottom magnetic pole;

(A-3) depositing a first low temperature silicon oxide layer on the bottom magnetic pole to form a first dielectric (insulation) layer;

(A-4) forming a copper layer on the first dielectric layer by chemical vapor deposition (CVD) or sputtering on the first dielectric layer, followed by using a second lithography and the reactive ion etching technique to form a conductive coil;

(A-5) depositing a second low temperature silicon oxide layer on the conductive coil to form a second dielectric layer, followed by using a third lithography and the reactive ion etching technique to form a contact hole; and (A-6) sputtering a second the film of a magnetic layer on the second low temperature silicon oxide layer, then using a fourth lithography and the reactive ion etching technique to form a top magnetic pole.

The read head of the present invention can be fabricated using another conventional thin-film process similar to that disclosed in the '088 patent. However, as in the fabrication of the read head, the magneto-resistance elements in the magnetically sensitive layers are also replaced by silicon-based thin films. Furthermore, since silicon-based materials show very little magneto-resistance effect at room temperature, the magnetically sensitive layers comprise double-drain polycrystalline thin-films transistors (DTFTs) to provide the required sensitivity. The various thin films are formed on a substrate that already contains the accessory circuits fabricated thereon, but with a space reserved for depositing the thin films read elements. In another preferred embodiment, a read head of the present invention is fabricated in accordance with the following procedure:

- (B-1) fabricating a DSP circuit and other necessary and/or desired circuits on a substrate while reserving a space near the edge of the designed chip area for the read head, which contains a plurality of read elements, to be subsequently fabricated;
- (B-2) depositing a first magnetic thin film on the reserved area of the substrate by sputtering, then using a first lithography and a reactive ion etching technique to form a first magnetic conduction medium;
- (B-3) depositing a first low temperature silicon oxide layer on the first magnetic conduction medium to form a first dielectric (insulation) layer;
- (B-4) forming a first polycrystalline silicon (poly-Si) layer on the first dielectric layer; then using a second lithography and the reactive ion etching technique to form a predetermined device structure;
- (B-5) depositing a second low temperature silicon oxide layer on the predetermined device structure to form a second dielectric layer;
- (B-6) depositing a second poly-Si layer on the second dielectric layer and using a third lithography and the reactive ion etching technique to form a gate; and
- (B-7) forming a predetermined source and drain structure on the first poly-Si layer by ion implantation, followed by low temperature annealing;
- (B-8) depositing a third low temperature silicon oxide layer on the gate formed in step (B-6) to form a third dielectric layer; and
- (B-9) depositing a second magnetic thin film on the third dielectric layer and using a fourth lithography and the reactive ion etching technique to form a second magnetic conduction medium.

The read and write heads are respectively passivated and VLSI-compatibly connected to the DSP circuits after the fabrication process.

In the present invention, because the magnetically sensitive element is placed inside the magnetic circuitry, the magnetically sensitive layer is deposited overlaying a magnetic thin film. This necessitates a low temperature fabrication process to avoid destroying the magnetic film. The low temperature process of the present invention also allows the accessory electronic circuits such as the signal processing circuits to remain intact during the fabrication of the write and/or read heads. With the present invention, several hundred individual write or read elements can be provided in a single chip having a width of only several millimeters. Each of the individual write or read elements can be assigned to write or read a respective track of data, or, alternatively, several of such elements can be grouped together and assigned to collectively write or read a common track of data to thus ensure the accuracy of data transfer. Furthermore, since the high-density electronic head of the present can be fabricated using a VLSI-compatible process, the production cost can be substantially lowered. The VLSI-compatible process also ensures excellent quality control and reduced labor requirement.

BRIEF DESCRIPTION OF THE DRAWING

The present invention will be described in detail with reference to the drawings showing the preferred embodiment of the present invention, wherein.

DETAILED DESCRIPTION OF THE PREFERRED EMBODIMENT

The present invention discloses a monolithic high-density electronic head that can concurrently record (i.e., read and/or write) a vast number, in the order of several hundred, of tracks of magnetically recordable data. The high-density electronic head disclosed in the present invention is provided in the form of a single IC chip, which contains a plurality of read and/or write elements fabricated by a thin film process, the same chip also contains a digital signal processing (DSP) circuit and other necessary or desired circuit components that were fabricated on a substrate prior to the fabrication of the multiple read and/or write elements.

The write and read heads are preferably fabricated in separate chips, and each chip contains a separate set of DSP circuits and other necessary accessory circuits of its own. Both the write and read heads are fabricated using the conventional thin-film technology. However, the magneto-resistance elements provided in the conventional sensitive magnetic layers are replaced with silicon-based thin films. The various thin films are formed on a substrate that already contains the accessory circuits pre-fabricated thereon, but with a space reserved for depositing the various thin films which form the write or read elements. Furthermore, because the silicon-based materials show very little magneto-resistance effect at room temperature, the magnetically sensitive layers of the read head of the present invention are provided in the form of specially structured double-drain polycrystalline thin-films transistors (DTFTs) to give the required sensitivity.

Figure 1:
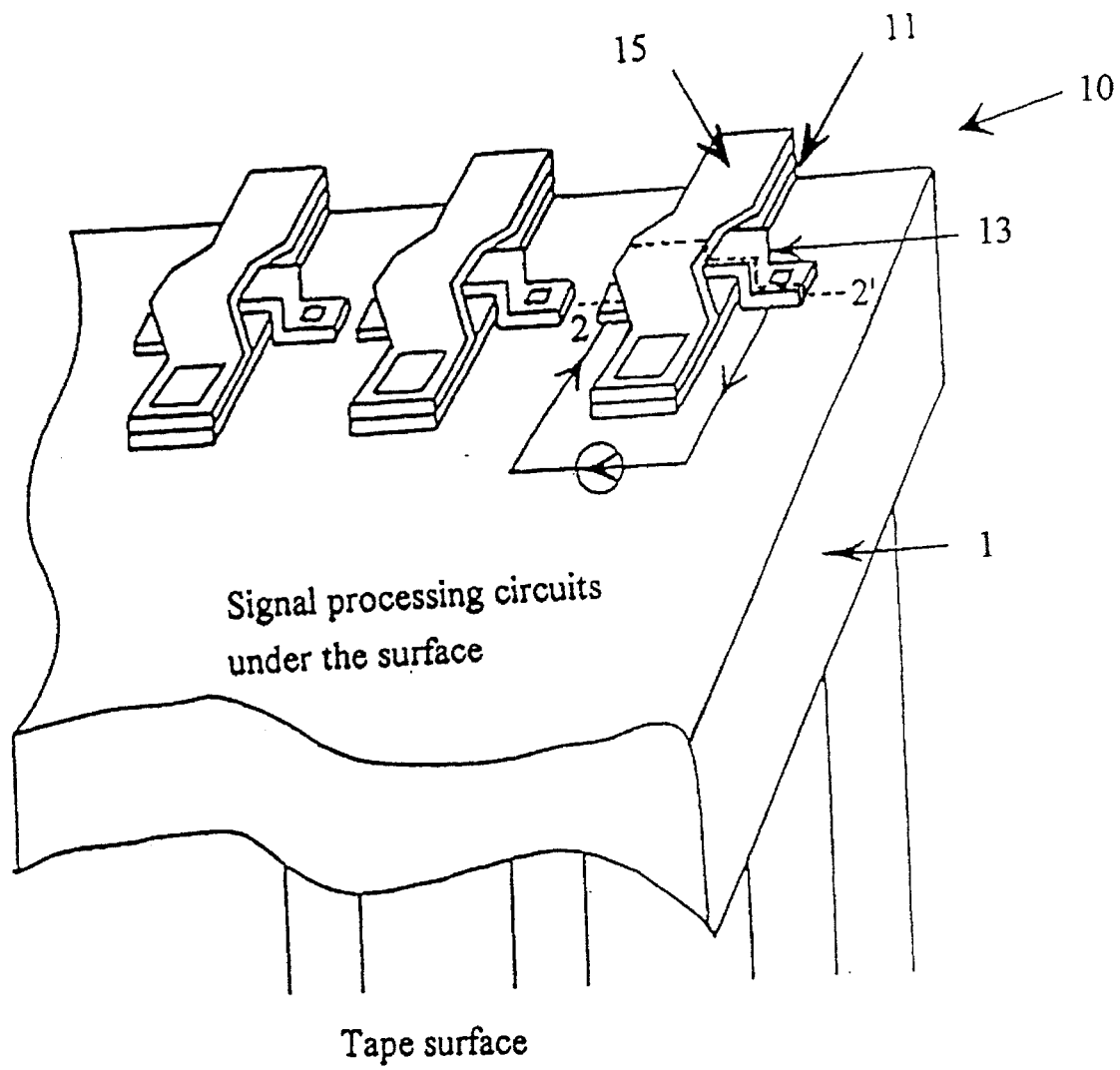
FIG. 1 is a partial perspective view according to a preferred embodiment of the present invention showing a plurality of write elements, the accessory electronic circuits in the chip are omitted.
Figure 2:
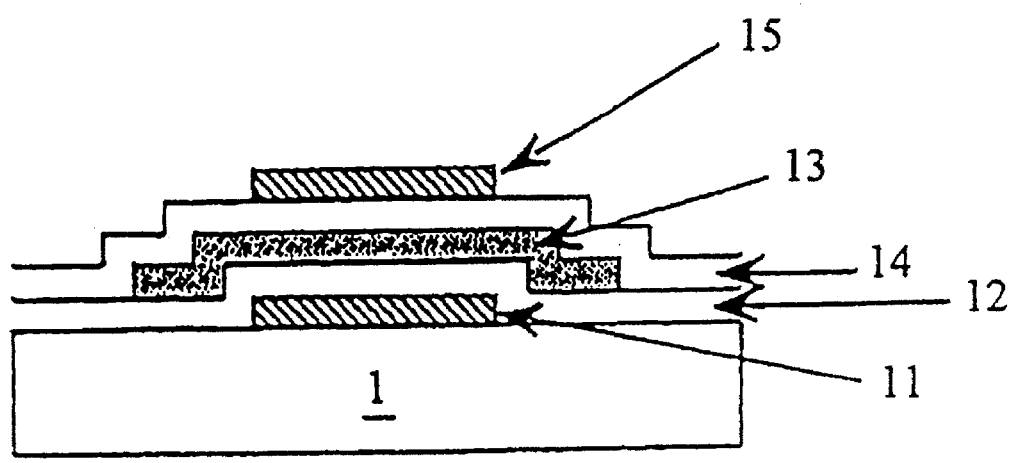
FIG. 2 is a schematic view of the preferred embodiment of the present invention as shown in FIG. 1, showing the relationship among the various layers thereof.
Figure 7:
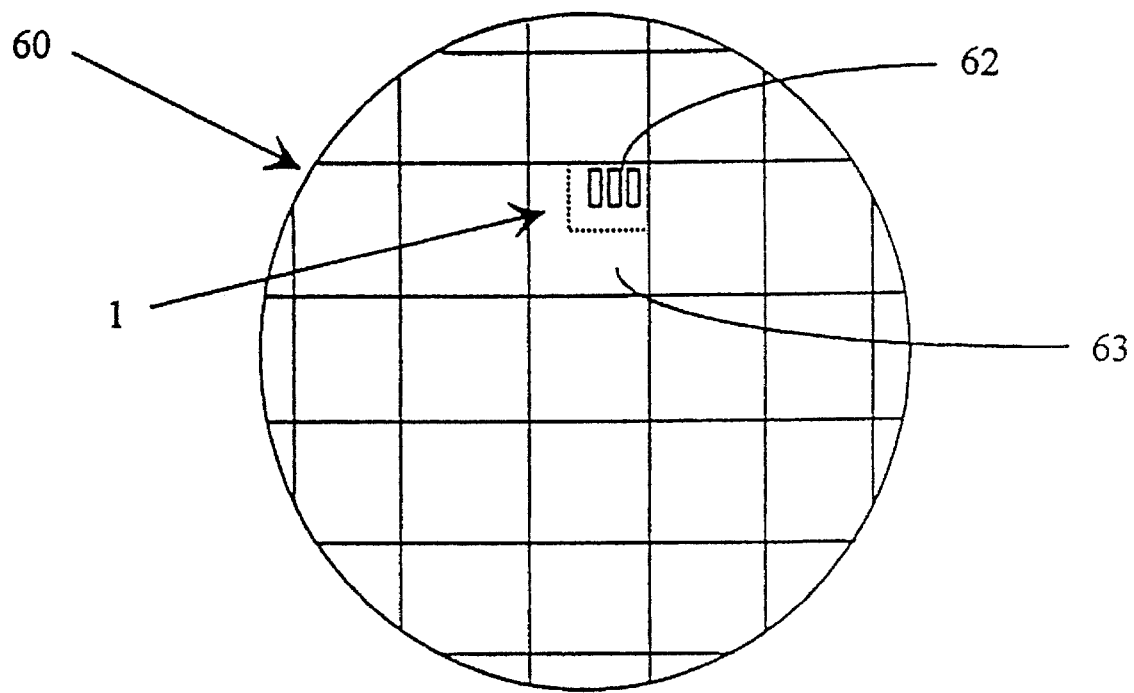
FIG. 7 is a schematic diagram showing a wafer containing a plurality of the composite IC chips (only one is shown) prepared in the present invention, each of the composite IC chip contains the multi-track read and/or write head and the accessory circuits such as signal processing circuits.

Now referring to the drawings. FIG. 1 is a partial perspective view of a composite chip according to a preferred embodiment of the present invention; it shows a plurality of write elements, with the accessory electronic circuits in the chip being omitted. And FIG. 2 is a schematic view of the preferred embodiment of the present invention as shown in FIG. 1, showing the relationship among the various layers thereof The chip shown in FIG. 1 is one of the a number of chips 61 cut out from a wafer 60, as illustrated in FIG. 7 (which is shown only for illustrative purposes and and is not drawn to scale). The chips 61 are fabricated using a VLSI-compatible process. The write head 10 as shown in FIG. 1 is illustrated as the recording (writing or reading) head 62 shown in FIG. 7 which occupies the near-edged portion of the chip 61. The pre-fabricated circuit portion 63 is not shown in FIG. 1.

In FIGS. 1 and 2, it is shown a substrate 1, which has been fabricated thereon the accessory circuits including signal processing circuits and amplification circuits. On a reserved area of substrate 1 of the chip 61 which is provided near the edge thereof; a first thin film of a magnetic layer is sputtered. The magnetic layer can be made from Fe, Co, Ni, etc., or their alloys. The first magnetic layer is masked with a first lithography and etched with a reactive ion etching technique to form the bottom magnetic pole 11 of the write head 10. After the first magnetic layer 11 is formed, a first low temperature silicon oxide layer 12 is deposited thereupon to form a first dielectric (insulation) layer 12. Then a copper layer is formed on the first dielectric layer using the technique of chemical vapor deposition (CVD) or sputtering. The copper layer is masked using a second lithography and etched with the reactive ion etching technique to form a conductive coil 13. Thereafter, a second low temperature silicon oxide layer is deposited on the conductive coil to form a second dielectric layer. The second dielectric layer is etched according to a third lithogaphy and using the reactive ion etching technique to form a contact hole 14. Finally a second thin film of a magnetic layer is sputtered on the second low temperature silicon oxide layer, followed by a reactive ion etching process according to a fourth lithography to form a top magnetic pole 15.

Figure 3:
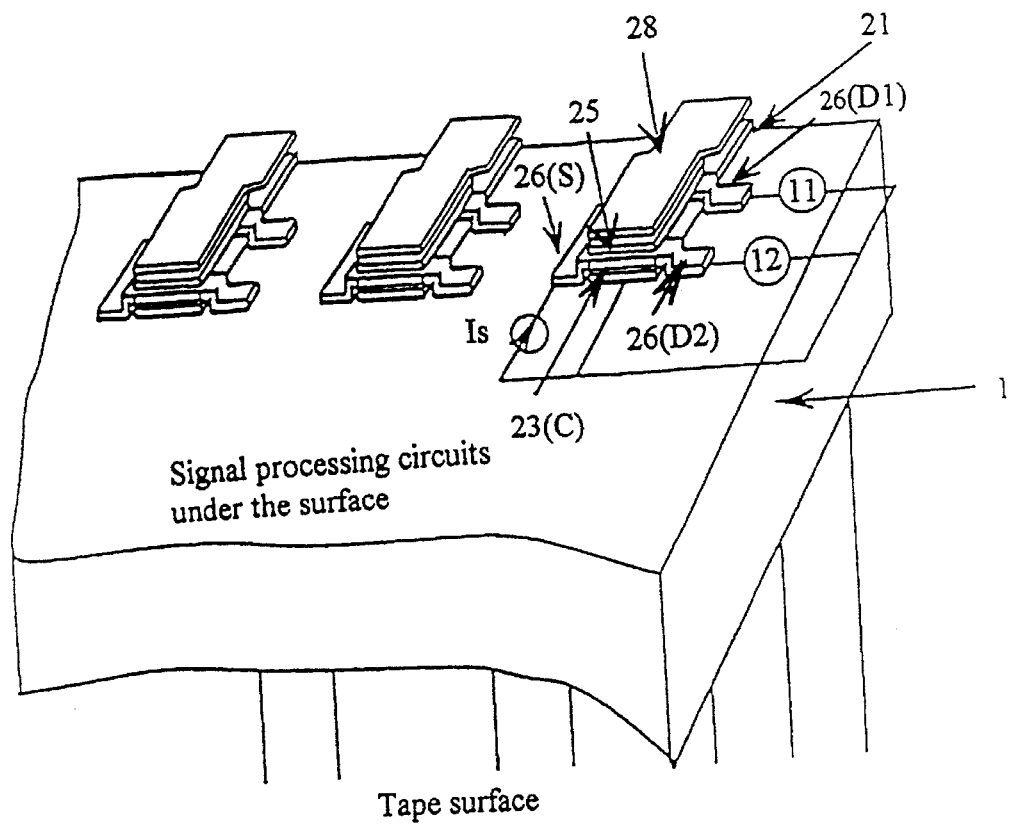
FIG. 3 is a partial perspective view according to another preferred embodiment of the present invention showing a plurality of read elements, the accessory electronic circuits in the chip are also omitted.
Figure 4:
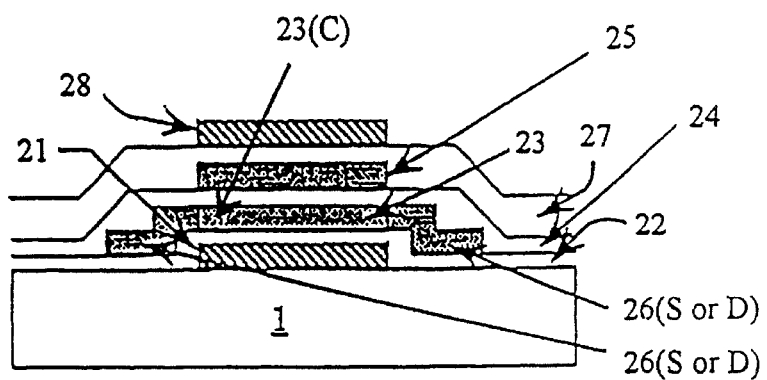
FIG. 4 is a schematic view of the preferred embodiment of the present invention as shown in FIG. 3, showing the relationship among the various layers thereof.

FIG. 3 is a partial perspective view according to another preferred embodiment of the present invention showing a plurality of read elements, with the accessory electronic circuits in the chip also being omitted. And FIG. 4 is a schematic view of the preferred embodiment of the present invention as shown in FIG. 3, showing the relationship among the various layers thereof. The chip shown in Fig. 3 is also one of the number of chips 61 cut out from the wafer 60, as illustrated in FIG. 7. The chips 61 are also fabricated using a VLSI-compatible process. The read head 20 as shown in FIG. 3 is illustrated as the recording (writing or reading) head 62 shown in FIG. 7 which occupies a similarly near-edge portion of the chip 61. The pre-fabricated circuit portion 63 is also omitted from FIG. 3.

In FIGS. 3 and 4, it is also shown a substrate 1, which has been fabricated thereon the accessory circuits including the signal processing circuits and the amplification circuits. On the reserved area of the chip 61 which is positioned near the edge of the chip, a first magnetic thin film layer is deposited by sputtering. The first magnetic thin film layer is masked with a first lithography and etched with a reactive ion etching technique to form the first magnetic conduction medium 21 of the read head 20. After the first magnetic thin film layer 21 is formed, a first low temperature silicon oxide layer is deposited on the bottom magnetic pole to form a first dielectric (insulation) layer 22. Then a first poly-Si layer is formed on the first dielectric layer. The first poly-Si layer is masked and etched according to a second lithography and using the reactive ion etching technique form a predetermined device structure 23. Thereafter, a second low temperature silicon oxide layer is deposited on the predetermined device structure 23 to form a second dielectric layer 24. Subsequently, a second poly-Si layer is deposited on the second dielectric layer 24 which is masked and etched using a third lithography and the reactive ion etching technique to form a gate 25. Then a predetermined source 26(S) and drain 26 (D) structure having a channel 23 (C) in between is formed on the first poly-Si layer 23 by ion implantation, followed by low temperature annealing. After the source and drain structure 26 is formed, a third low temperature silicon oxide layer is deposited on the gate 25 to form a third dielectric layer 27. Finally, a second magnetic thin film layer is deposited on the third dielectric layer 27 which is masked and etched using a fourth lithography and the reactive ion etching technique to form a second magnetic conduction medium 28.

Figure 5:
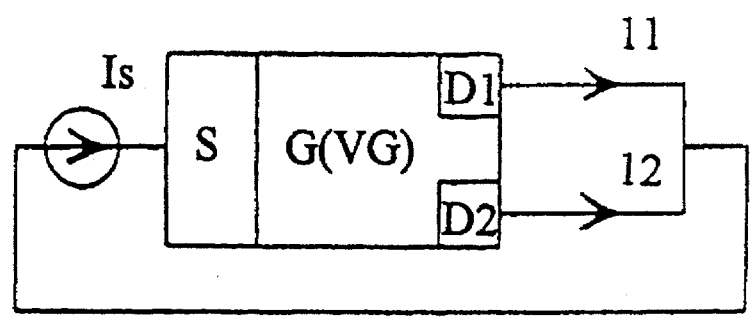
FIG. 5 is a schematic diagram showing the layout of the double-drain thin-film transistor (DTFT) disclosed in a preferred embodiment of the present invention.
Figure 6A:
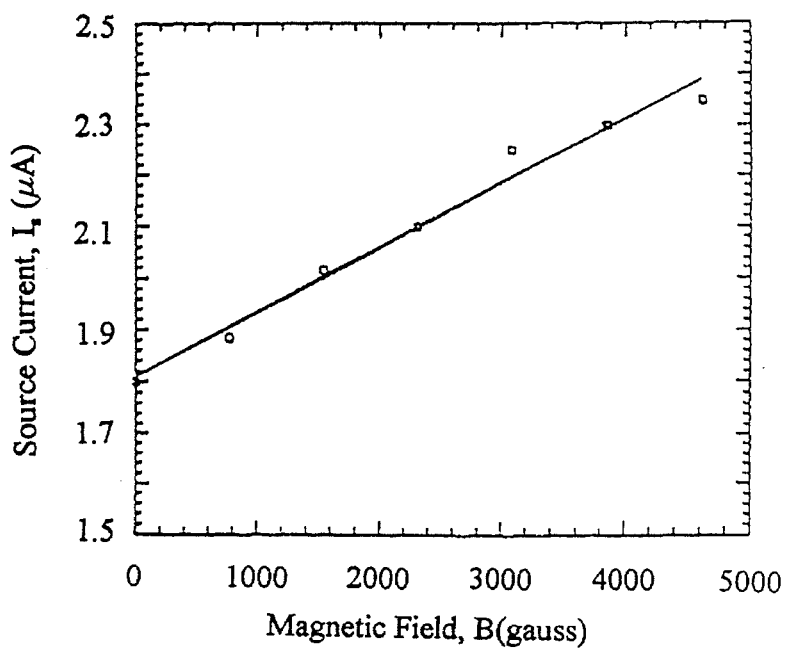
FIGS. 6(A) and 6(B) show the test results obtained from the double-drain thin-film transistor prepared in the present invention.
Figure 6B:
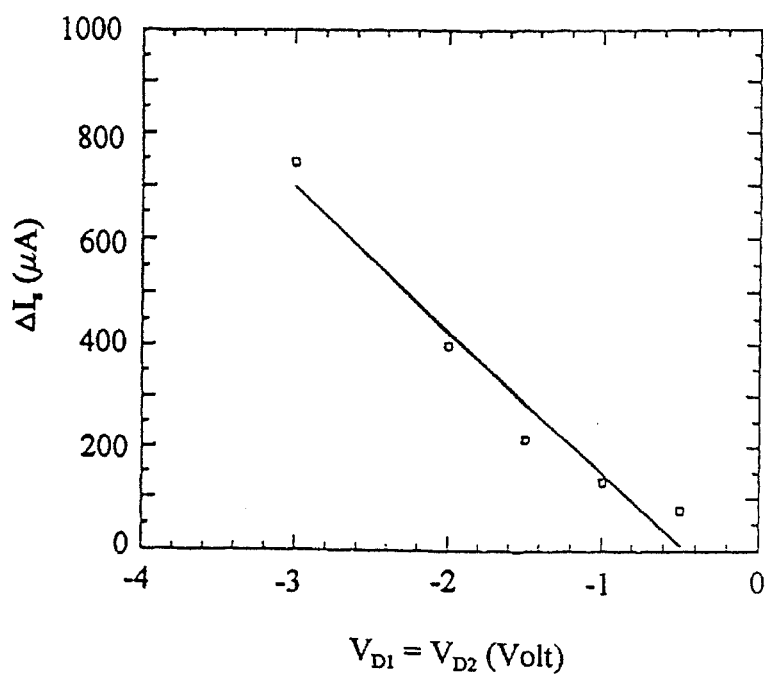

Because the silicon-based materials show very little magneto-resistance effect thus low sensitivity at room temperature, the first poly-Si layer 23, the second dielectric layer 24 and gate 25, which contain the predetermined device structure, are fabricated as a double-drain, D 1 and D2, polycrystalline thin-films transistor (DTFT) to thus provide the required sensitivity. FIG. 5 is a schematic diagram showing a preferred layout of the double-drain thin-film transistor (DTFT) disclosed in the present invention. In FIG. 5, S stands for source, G(VG) is the gate voltage, and D1 and D2 represent the two drains, respectively. The test results obtained from the double-drain thin-film transistor prepared in the present invention are shown in FIGS. 6(A) and 6(B). The DTFT shown in FIGS. 6(A) and 6(B) has a dimension of 100 μm×100 μm. FIG. 6(A) shows a plot of the measured source current, $I_s$ (in μA) vs. the applied magnetic field, B (in Gauss) under the condition of −10 V gate voltage and both drains being at −2 V. FIG. 6(B) is a plot of the measured source current, $I_s$ (in μA) vs. the voltage at the drains ($V_{D1}$ and $V_{D2}$, in volts) under the condition of −10 V gate voltage and an applied magnetic filed of 3077 Gauss. It is to be noted that although that the magnetic sensitivity measured from DTFTs is lower than field effect transistors (FETs), they provide adequate sensitivity to meet the recording requirement. Furthermore, because of the extremely large number of read elements that can be provided in a single read chip, several read elements can be configured to read a common track of recorded data to thus provide excellent sensitivity.

With the present invention, because no wire-bonding is required between the write or read head and the necessary circuitry components, IC chips providing very high density monolithic electronic heads can be manufactured using a VLSI-compatible process as illustrated in FIG. 7, each of the chips containing a very large number, in the order of several hundred, of read and/or write elements, as well as the necessary and/or desired electronic circuits. Although it is possible to provide IC chips that contain both the write and read elements, it is preferred that each chip contains either the write or read elements only, and each has its own accessory circuits. One of the advantages of the present invention is that the electronic heads are fabricated using a low thermal budget process (≦550° C.); therefore, the magnetic films will not be adversely affected. The low temperature process of the present invention also allows the pre-fabricated accessory electronic circuits such as the signal processing circuits to maintain intact during the fabrication of the write and/or read heads. After the write and/or read elements are fabricated, they can be connected to the signal processing circuits using a number of standard VLSI interconnection technologies. Furthermore, although each of the individual write or read elements is designed to write or read a respective track of data, because of the large number of write or read elements that can be provided in the composite IC chip of the present invention, several of such elements can be assigned to collectively write or read a common track of data to thus ensure the accuracy of the data transfer. The VLSI-compatible process of the present invention also ensures excellent quality control and reduced labor requirement.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A monolithic IC chip for writing and/or reading multiple tracks of magnetically recordable data comprising:
   (a) a substrate and a signal processing circuit pre-fabricated on said substrate;
   (b) a plurality of write and/or read elements fabricated on said substrate using a thin-film technology; and
   (c) connection circuitry connecting said write and/or read elements with said signal processing circuit;
   (d) wherein said signal processing circuit, said write and/or read elements, and said connection circuitry are all fabricated on said substrate using a VLSI-compatible process so as to form a monolithic IC chip.

2. The monolithic IC chip according to claim 1 wherein only write elements are contained in said chip and said chip is provided only for writing multiple tracks of magnetically recordable data.

3. The monolithic IC chip according to claim 2 wherein said chip is fabricated by the steps of:
   (a) pre-fabricating a signal processing circuit on said substrate while reserving a reserved space on said substrate;
   (b) fabricating said plurality of write and/or read elements on said reserved space of substrate; and
   (c) forming a connection circuitry, either before or after step (b), to provide connections between said write and/or read elements with said signal processing circuit; wherein the steps of (a), (b), and (c) are all conducted using VLSI-compatible processes.

4. The monolithic IC chip according to claim 2 wherein said chip is fabricated by a VLSI-compatible process, which comprises the steps of:
   (a) fabricating said signal processing circuit on said substrate while reserving a space near the edge of said substrate;
   (b) sputtering a first magnetic layer on said reserved space of said substrate;
   (c) using a first lithography and a reactive ion etching technique to form a bottom magnetic pole from said first magnetic layer;
   (d) depositing a first low temperature silicon oxide layer on said bottom magnetic pole to form a first dielectric layer;
   (e) forming a conductive layer on the first dielectric layer by chemical vapor deposition or sputtering on said first dielectric layer;
   (f) using a second lithography and the reactive ion etching technique to form a conductive coil from said conductive layer;
   (g) depositing a second low temperature silicon oxide layer on said conductive coil to form a second dielectric layer;
   (h) using a third lithography and the reactive ion etching technique to form a contact hole in said second dielectric layer;
   (I) forming a second magnetic layer on said second low temperature silicon oxide layer by sputtering; and
   (j) using a fourth lithography and the reactive ion etching technique to form a top magnetic pole from said second magnetic layer.

5. The monolithic IC chip according to claim 1 wherein each of said write elements comprises at least two low temperature silicon oxide layers as insulation layers and a conductive layer sandwiched between said two low temperature silicon oxide layers.

6. The monolithic IC chip according to claim 1 wherein each of said write elements comprises
   (a) a first magnetic layer sputtered on said substrate;
   (b) a first low temperature silicon oxide layer deposited on said first magnetic layer;
   (c) a conductive coil formed on said first low temperature silicon oxide layer;
   (d) a second low temperature silicon oxide layer deposited on said conductive coil; and
   (e) a second magnetic layer sputtered on said second low temperature silicon oxide layer.

7. The monolithic IC chip according to claim 6 wherein each of said magnetic layers is made of Fe, Co, Ni, etc., or their alloys.

8. The monolithic IC chip according to claim 6 wherein each of said conductive layer is a copper layer.

9. The monolithic IC chip according to claim 1 wherein only read elements are contained in said chip and said chip is provided only for reading multiple tracks of magnetically recordable data.

10. The monolithic IC chip according to claim 9 wherein said chip is fabricated by a VLSI-compatible process, which comprises the steps of:
    (a) fabricating said signal processing circuit on said substrate while reserving a space near the edge of said substrate;
    (b) depositing a first magnetic conduction layer on said reserved area of said substrate by sputtering;
    (c) using a first lithography and a reactive ion etching technique to form a first magnetic conduction medium from said first magnetic conduction layer;
    (d) depositing a first low temperature silicon oxide layer on said magnetic conduction medium to form a first dielectric layer;
    (e) forming a first polycrystalline silicon layer on said first dielectric layer;
    (f) using a second lithography and the reactive ion etching technique to form a predetermined device structure on said first polycrystalline silicon layer;
    (g) depositing a second low temperature silicon oxide layer on said predetermined device structure to form a second dielectric layer;
    (h) depositing a second polycrystalline silicon layer on said second dielectric layer;
    (I) using a third lithography and the reactive ion etching technique to form a gate from said second polycrystalline silicon layer;
    (j) forming a predetermined source and drain structure on said first polycrystalline silicon layer by ion implantation and low temperature annealing;

(k) depositing a third low temperature silicon oxide layer on said gate to form a third dielectric layer;

(l) depositing a second magnetic conduction layer on said third dielectric layer; and (m) using a fourth lithography and reactive ion etching technique to form a second magnetic conduction medium.

11. The monolithic IC chip according to claim 1 wherein each of said read elements comprises two polycrystalline silicon layers interposed among three low temperature silicon oxide layers, and said polycrystalline silicon layers include a first polycrystalline silicon layer which is structured as a double-drain thin film transistor.

12. The monolithic IC chip according to claim 11 wherein each of said polycrystalline silicon layers is a p+ or n+ polycrystalline silicon layer.

13. The monolithic IC chip according to claim 1 wherein each of said read elements comprises:

(a) a first magnetic conduction medium deposited on said substrate by sputtering and reactive ion etching;

(b) a first low temperature silicon oxide layer deposited on said first magnetic conduction medium to form a first dielectric layer;

(c) a first polycrystalline silicon layer formed on said first dielectric layer;

(d) a second low temperature silicon oxide layer deposited on said first polycrystalline silicon layer to form a second dielectric layer;

(e) a second polycrystalline silicon layer deposited on said second dielectric layer to form a gate;

(f) a third low temperature silicon oxide layer deposited on said gate to form a third dielectric layer; and (g) a second magnetic conduction medium deposited on said third dielectric layer by sputtering and reactive ion etching;

(h) wherein said first polycrystalline silicon layer is fabricated to form a predetermined source and drain structure having one source and two drains by ion implantation and low temperature annealing.

14. The monolithic IC chip according to claim 1 wherein said chip contains at least one hundred of said mite or read elements.

15. The monolithic IC chip according to claim 1 wherein said chip contains at least fifty of said write or read elements.

16. The monolithic IC chip according to claim 1 wherein said chip contains at least twenty of said write or read elements.

17. The monolithic IC chip according to claim 1 wherein each of said write or read elements is designed to write or read a separate track of data.

18. The monolithic IC chip according to claim 1 wherein a predetermined number of said write or read elements are grouped and designed to collectively write or read a respective track of data.

19. The monolithic IC chip according to claim 1 wherein said chip contains both a plurality of read elements and a plurality of write elements.

* * * * *